(12) United States Patent
Kesselman

(10) Patent No.: US 9,152,549 B1
(45) Date of Patent: Oct. 6, 2015

(54) DYNAMICALLY ALLOCATING MEMORY FOR PROCESSES

(71) Applicant: Alex Kesselman, Sunnyvale, CA (US)

(72) Inventor: Alex Kesselman, Sunnyvale, CA (US)

(73) Assignee: GOOGLE INC., Mountain View, CA (US)

(*) Notice: Subject to any disclaimer, the term of this patent is extended or adjusted under 35 U.S.C. 154(b) by 298 days.

(21) Appl. No.: 13/854,891

(22) Filed: Apr. 1, 2013

Related U.S. Application Data

(60) Provisional application No. 61/618,547, filed on Mar. 30, 2012.

(51) Int. Cl.
  *G06F 12/02* (2006.01)
  *G06F 9/50* (2006.01)
  *G06F 12/06* (2006.01)

(52) U.S. Cl.
  CPC ............ *G06F 12/023* (2013.01); *G06F 9/5016* (2013.01); *G06F 9/5061* (2013.01); *G06F 12/0253* (2013.01); *G06F 12/0646* (2013.01)

(58) Field of Classification Search
  CPC ... G06F 12/02; G06F 12/023; G06F 12/0253; G06F 12/0646; G06F 9/5016; G06F 9/5061
  USPC .................................................. 711/153, 173
  See application file for complete search history.

(56) References Cited

U.S. PATENT DOCUMENTS

| | | | | |
|---|---|---|---|---|
| 6,408,313 | B1* | 6/2002 | Campbell et al. | 711/170 |
| 6,539,464 | B1* | 3/2003 | Getov | 711/170 |
| 2007/0233991 | A1* | 10/2007 | Diao et al. | 711/170 |

OTHER PUBLICATIONS

Afek, Phantom, A Simple and Effective Flow Control Scheme, Computer Networks 32(3), 2000, pp. 277-305.
Choudhury, Dynamic Queue Length Thresholds for Shared-Memory Packet Switches, IEEE/ACM Trans. Netw. 6(2), 1998, pp. 130-140.
en.wikipedia.org/wiki/quality_of_service, Apr. 16, 2013, 11 pgs.
Guerin, Scalable QoS Provision Through Buffer Management, SIGCOMM'1998, Vancouver, British Columbia, pp. 29-40.

\* cited by examiner

*Primary Examiner* — Hiep Nguyen
(74) *Attorney, Agent, or Firm* — Morgan, Lewis & Bockius LLP

(57) ABSTRACT

A system, computer-readable storage medium storing at least one program, and a computer-implemented method for dynamically allocating memory for processes is presented. A first request to allocate memory for a first process is received, where the first process is associated with a first quality-of-service class in a plurality of quality-of-service classes. A first memory allocation for the first quality-of-service class is calculated as a function of a current amount of free memory on the server and a first minimum memory allocation for the first quality-of-service class. An amount of memory currently used by processes associated with the first quality-of-service class is determined. The first request is rejected when the amount of memory currently used by the processes associated with the first quality-of-service class is greater than or equal to the first memory allocation.

20 Claims, 12 Drawing Sheets

$A_i = \min(CR_i + CM_i * F, M)$

| Class | Minimum Memory Allocation ($CR_i$) | Free Memory Multiplier ($CM_i$) | Memory Allocation ($A_i$) | Current Amount of Memory Used ($U_i$) |
|---|---|---|---|---|
| A | 0.4M | 5 | 0.65M | 0.6M |
| B | 0.3M | 4 | 0.5M | 0.1M |
| C | 0.2M | 3 | 0.35M | 0.1M |
| D | 0.1M | 2 | 0.2M | 0.1M |
| E | 0 | 1 | 0.05M | 0.05M |

DYNAMICALLY ALLOCATING MEMORY FOR PROCESSES

RELATED APPLICATION

This application claims priority to U.S. Provisional Application No. 61/618,547, filed Mar. 30, 2012, which is incorporated by reference herein in its entirety.

TECHNICAL FIELD

The disclosed embodiments relate generally to allocating memory for processes.

BACKGROUND

Memory on a server is a limited resource that is shared by all processes executing on the server. A memory management system of the server handles requests to allocate memory to processes based on an amount of free memory on the server. The memory management system also releases memory when processes no longer need the memory. Unfortunately, existing memory management systems do not account for quality-of-service requirements of the processes when allocating memory to the processes. For example, consider a first request to allocate memory to a first process and a second request to allocate memory to a second process. Assume that the first request is received before the second request. Also assume that the second request has a higher quality-of-service requirement than the first process. In other words, the resources of the server should be prioritized for use by the second process before the first process. However, since the first request is received before then second request, the memory management system allocates memory to the first process. If the amount of free memory on the server is low, there might not be enough memory to allocate to the second process when the second request is received. Thus, the quality-of-service requirement of the second process may not be achieved.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings.

DETAILED DESCRIPTION

Figure 1:
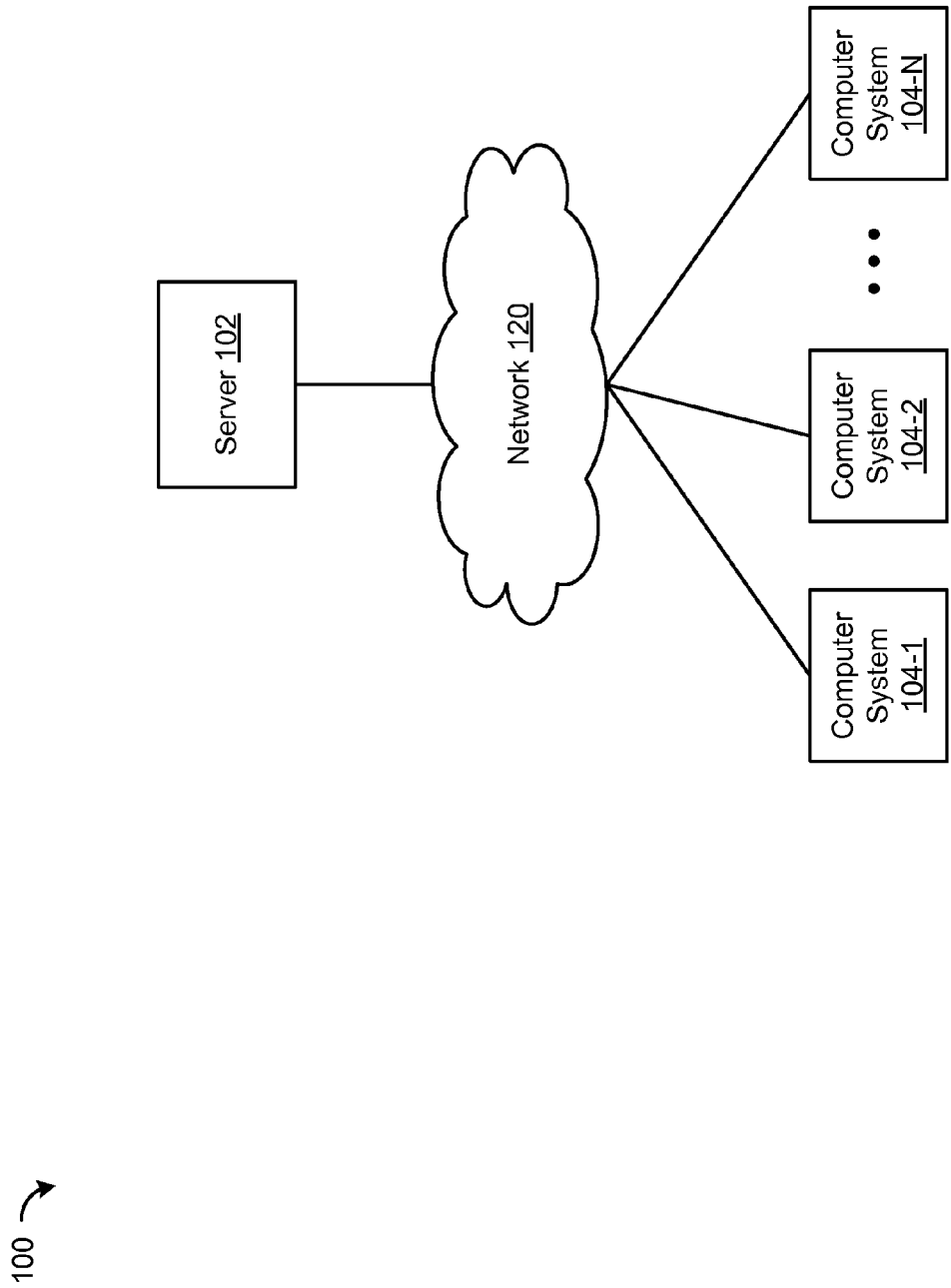
FIG. 1 is a block diagram illustrating a network system, according to some embodiments.

FIG. 1 is a block diagram illustrating a network system 100, according to some embodiments. The network system 100 includes a server 102 coupled to a plurality of computer system 104-1 to 104-N via network 120. The computer systems 104-1 to 104-N include, but are not limited to, a desktop computer system, a laptop computer system, a smart phone, a mobile phone, a tablet computer system, a server, a game console, a set top box, a television set, and any device that can transmit and/or receive data via network 120. Network 120 may generally include any type of wired or wireless communication channel capable of coupling together computing nodes. This includes, but is not limited to, a local area network, a wide area network, or a combination of networks. In some embodiments, network 120 includes the Internet.

Note that although FIG. 1 shows one instance of the server 102, multiple servers may be present in the network system 100. For example, the server 102 may include a plurality of distributed servers. The plurality of distributed servers may provide load balancing and/or may provide low-latency points of access to nearby computer systems. The distributed servers may be located within a single location (e.g., a data center, a building, etc.) or may be geographically distributed across multiple locations (e.g., data centers at various geographical locations, etc.). Also note that although the embodiments described herein refer to the server 102, the embodiments may be applied to multiple servers.

Figure 2:
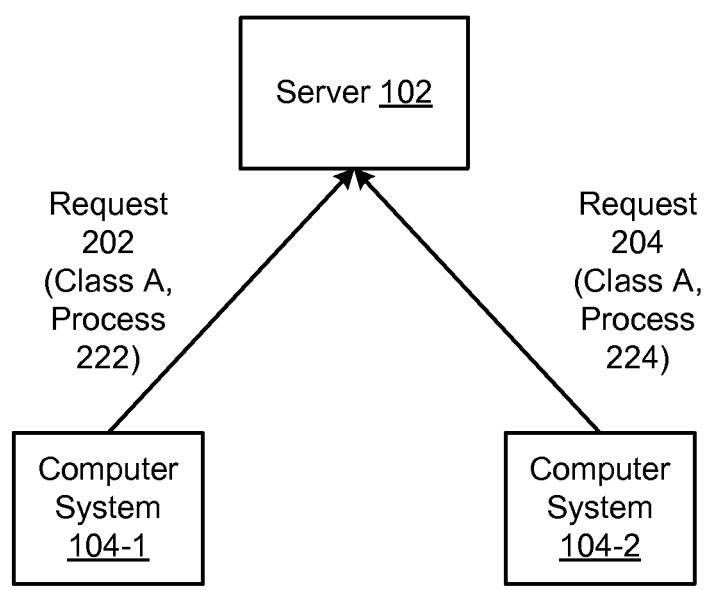
FIG. 2 is a block diagram illustrating example requests to allocate memory for processes, according to some embodiments.

FIG. 2 is a block diagram illustrating example requests to allocate memory for processes, according to some embodiments. As illustrated in FIG. 2A, the computer system 104-1 issues a request 202 to the server 102 to allocate memory for a process 222 that is associated with a quality-of-service class A and the computer system 104-2 issues a request 204 to the server 102 to allocate memory for a process 224 that is associated with a quality-of-service class A. The server 102 may receive the request 202 and the request 204 concurrently (e.g., at the same time) or sequentially (e.g., one request is received after another). Note that the server 102 may also receive, from computer systems (e.g., the computer systems 104-1 to 104-N), other requests to allocate memory for other processes that are associated with other quality-of-service classes. Also note that a respective quality-of-service class (e.g., the quality-of-service class A) is associated with respective quality-of-service requirements that specify a service level for processes associated with the respective quality-of-service class. For example, the respective quality-of-service requirements may specify a respective priority level of processes associated with the respective quality-of-service. In another example, the respective quality-of-service requirements may specify a respective network bandwidth and CPU time allocated to processes associated with the respective quality-of-service. Note that the respective quality-of-service requirements may include multiple quality-of-service requirements (e.g., priority of processes, CPU time, network bandwidth, etc.).

In some implementations, a respective request to allocate memory for a respective process includes a desired memory allocation for the respective process. For example, the respective request may be a request to increase a memory allocation for the respective process in order to accommodate additional data and/or commands to be processed by the respective process.

In some implementations, a respective request to allocate memory for a respective process is associated with data and/or commands to be processed by the respective process. For example, the respective request may be a handshake operation between the computer system 104-1 and the server 102 in which the computer system 104-1 issues the respective request to the server 102 to allocate memory to the respective process on the server 102. If the respective request is accepted by the server 102 (e.g., by transmitting a message to the computer system 104-1 indicating that the server 102 has accepted the respective request), the computer system 104-1 may then transmit the data and/or the commands to be processed by the process.

In some implementations, the server 102 accepts or rejects a respective request to allocate memory for a respective process that is associated with a respective quality-of-service class based on a current amount of free memory on the server 102 and a respective minimum memory allocation for the respective quality-of-service class. These implementations are described in more detail below with reference to FIGS. 3A-3E and 6-8.

FIGS. 3A-3E are block diagrams illustrating example memory allocations for quality-of-service classes, according to some embodiments. As illustrated in these figures, the server 102 includes memory 302 having a total amount memory of M. In some implementations, memory 302 includes high-speed random access memory (RAM) (e.g., DRAM, SRAM, etc.). In some implementations, memory 302 includes non-volatile memory (e.g., magnetic disk storage devices, optical disk storage device, flash memory, etc.). In some implementations, memory 302 includes a combination of high-speed random access memory and non-volatile memory. As also illustrated in FIGS. 3A-3E, the server 102 handles five quality-of-service classes with decreasing quality-of-service requirements: Class A, Class B, Class C, Class D, and Class E. In other words, processes associated with Class A have a higher quality-of-service requirement than processes associated with Class E. Thus, the server 102 prioritizes allocation of memory to processes associated with Class A first, then to Class B, then to Class C, then to Class D, and finally to Class E. Note that the server 102 may handle more or fewer quality-of-service classes than illustrated in FIGS. 3A-3E.

In some implementations, the server 102 calculates memory allocations for quality-of-service classes as a function of a current amount of free memory on the server 102 and minimum memory allocations for the quality-of-service classes. For example, in some implementations, the server 102 calculates a respective memory allocation ($A_i$) for a respective quality-of-service class i as follows: $A_i = \min(CR_i + CM_i * F, M)$, where $CR_i$ is a respective minimum memory allocation for the respective quality-of-service class, $CM_i$ is a respective free memory multiplier for the respective quality-of-service class, and F is the amount of free memory (e.g., unused memory) of the server 102. A respective minimum memory allocation ($CR_i$) for a respective quality-of-service class i is an amount of the memory 302 that is guaranteed to be allocated to processes associated with the respective quality-of-service class i when (1) the processes associated with the respective quality-of-service class i requests it and (2) a current amount of memory used ($U_i$) by the respective quality-of-service class i is less than the respective minimum memory allocation ($CR_i$) for a respective quality-of-service class i. In other words, a current amount of memory used ($U_i$) by the respective quality-of-service class i may be less than the respective minimum memory allocation ($CR_i$) for the quality-of-service class i, but may increase to at least the respective minimum memory allocation ($CR_i$) for the quality-of-service class i should the processes associated with the respective quality-of-service class i require the memory. Similarly, the current amount of memory used ($U_i$) by the respective quality-of-service class i may be less than the respective memory allocation ($A_i$) for the respective quality-of-service class i, but may increase to at most the respective memory allocation ($A_i$) for the respective quality-of-service class i should the processes associated with the respective quality-of-service class require the memory. However, note that since the respective memory allocation ($A_i$) for the respective quality-of-service class i is a function of the amount of free memory F on the server 102, the value of the respective memory allocation ($A_i$) for the respective quality-of-service class i changes as memory is allocated to and released by processes on the server 102. Example values for $CR_i$ and $CM_i$ are illustrated in FIGS. 3A-3E. The values for $CR_i$ and $CM_i$ correspond to the quality-of-service requirement for Class i. For example, values for $CR_i$ and $CM_i$ for a first quality-of-service class that has a higher quality-of-service requirement than a second quality-of-service class are larger than values for $CR_i$ and $CM_i$ for the second quality-of-service class. This process of calculating memory allocations for quality-of-service classes is illustrated in FIGS. 3A-3E.

Figure 3A:
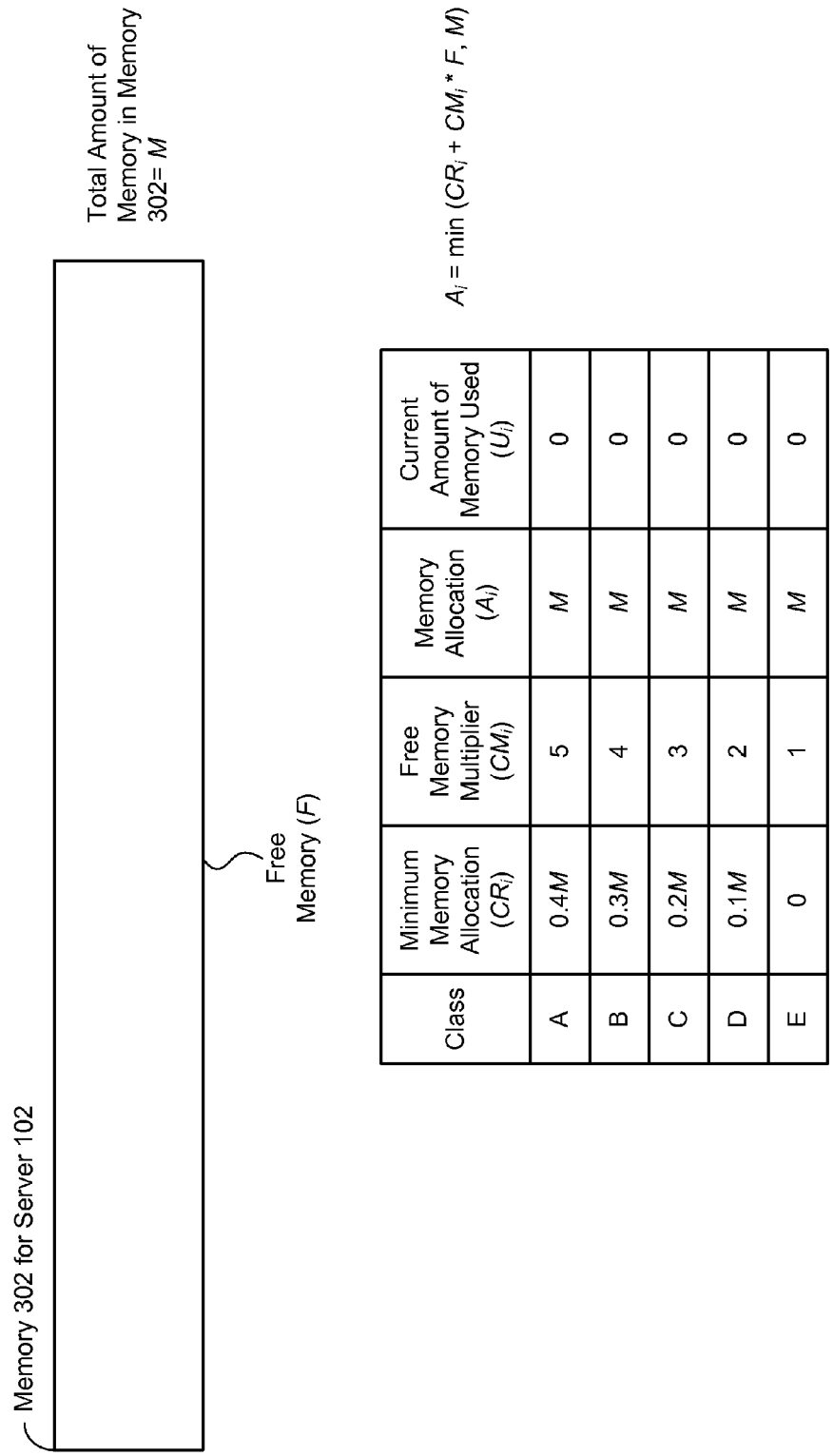
FIG. 3A is a block diagram illustrating an example memory allocation for quality-of-service classes, according to some embodiments.

In FIG. 3A, the amount of free memory (F) of memory 302 is M (i.e., the total amount of memory in memory 302). In other words, none of the Class A-E has any processes that are using memory 302. Accordingly, the memory allocation ($A_i$) for each of the quality-of-service i (i.e., Classes A-E) is M. When the server 102 receives a request to allocate memory to a process associated with any of the quality-of-service Classes A-E, the server 102 accepts the request and increases the memory allocation for the corresponding quality-of-service class. As the amount of memory 302 that is used increases (e.g., the amount of free memory F decreases), the server 102 accept or rejects a request to allocate memory to a quality-of-service class i based on a respective memory allocation ($A_i$) for the quality-of-service class i and the current amount of memory used ($U_i$) by processes associated with the quality-of-service class i. FIGS. 3B-3E provide examples memory allocations in which the server 102 accepts or rejects a request to allocate memory to a quality-of-service class i based on a respective memory allocation ($A_i$) for the quality-of-service class i and the current amount of memory used ($U_i$) by processes associated with the quality-of-service class i.

Figure 3B:
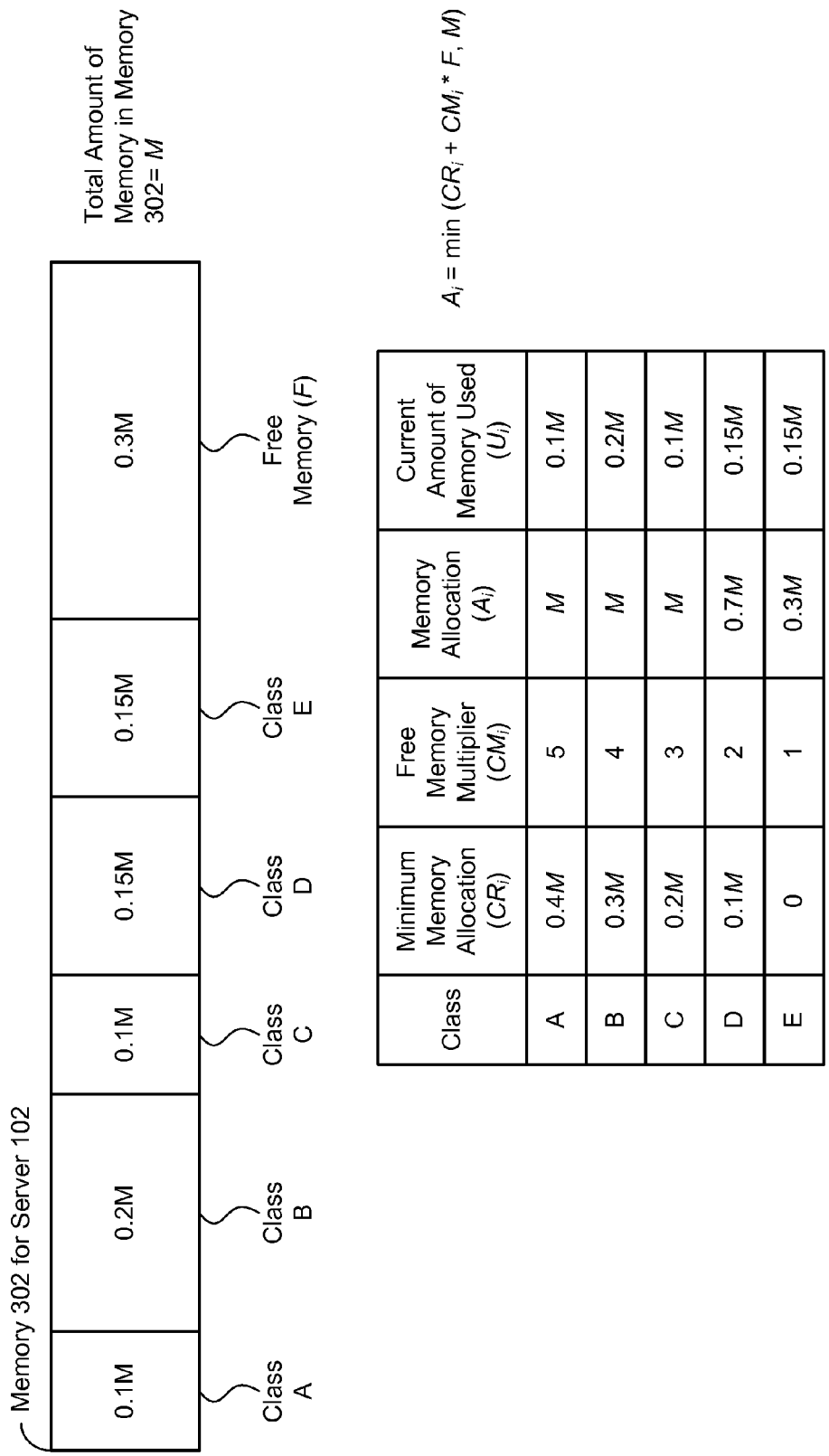
FIG. 3B is a block diagram illustrating another example memory allocation for quality-of-service classes, according to some embodiments.

In FIG. 3B, the current amount of memory used ($U_i$) by processes associated with the quality-of-service classes i (i.e., Classes A-E) are as follows: $U_A=0.1M$, $U_B=0.2M$, $U_C=0.1M$, $U_D=0.15M$, and $U_E=0.15M$. The amount free memory F is 0.3M (i.e., $F=M-(0.1M+0.2M+0.1M+0.15M+0.15M)$). Accordingly, the memory allocations ($A_i$) for the quality-of-service classes i (i.e., Classes A-E) are as follows: $A_A=M$, $A_B=M$, $A_C=M$, $A_D=0.7M$, and $A_E=0.3M$. Since the memory used ($U_A, U_B, U_C, U_D, U_E$) by processes associated with each of the quality-of-service Classes A-E is less than its respective memory allocations ($A_A, A_B, A_C, A_D, A_B$), when the server 102 receives a request to allocate memory for a process associated with any of the quality-of-service Classes A-E, the server 102 accepts the request and increases the memory allocation for the corresponding quality-of-service class.

Figure 3C:
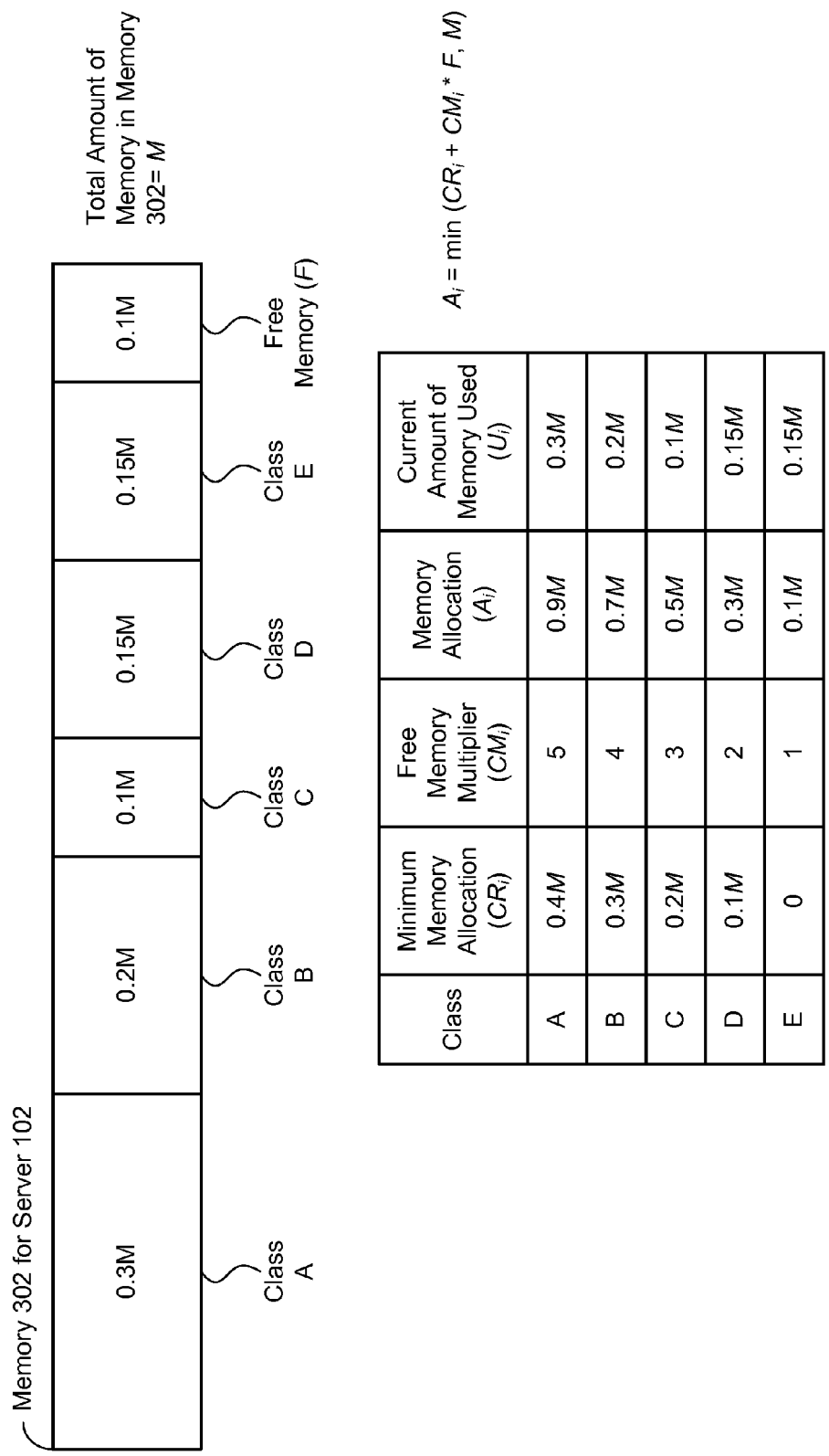
FIG. 3C is a block diagram illustrating another example memory allocation for quality-of-service classes, according to some embodiments.

In FIG. 3C, the current amount of memory used ($U_i$) by processes associated with the quality-of-service classes i (i.e., Classes A-E) are as follows: $U_A$=0.3M, $U_B$=0.2M, $U_C$=0.1M, $U_D$=0.15M, and $U_E$=0.15M. The amount free memory F is 0.1M (i.e., F=M−(0.3M+0.2M+0.1M+0.15M+0.15M)). Accordingly, the memory allocations ($A_i$) for the quality-of-service classes i (i.e., Classes A-E) are as follows: $A_A$=0.9M, $A_B$=0.7M, $A_C$=0.5M, $A_D$=0.3M, and $A_E$=0.1M. Since the memory used ($U_A$, $U_B$, $U_C$, $U_D$) by processes associated with each of the quality-of-service Classes A-D is less than its respective memory allocation ($A_A$, $A_B$, $A_C$, $A_D$), when the server 102 receives a request to allocate memory for a process associated with any of the quality-of-service Classes A-D, the server 102 accepts the request and increases the memory allocation for the corresponding quality-of-service class. However, since the memory used ($U_E$) by processes associated with the quality-of-service Class E is greater than its respective memory allocation ($A_E$), when the server 102 receives a request to allocate memory for a process associated with the quality-of-service Class E, the server 102 rejects the request.

Figure 3D:
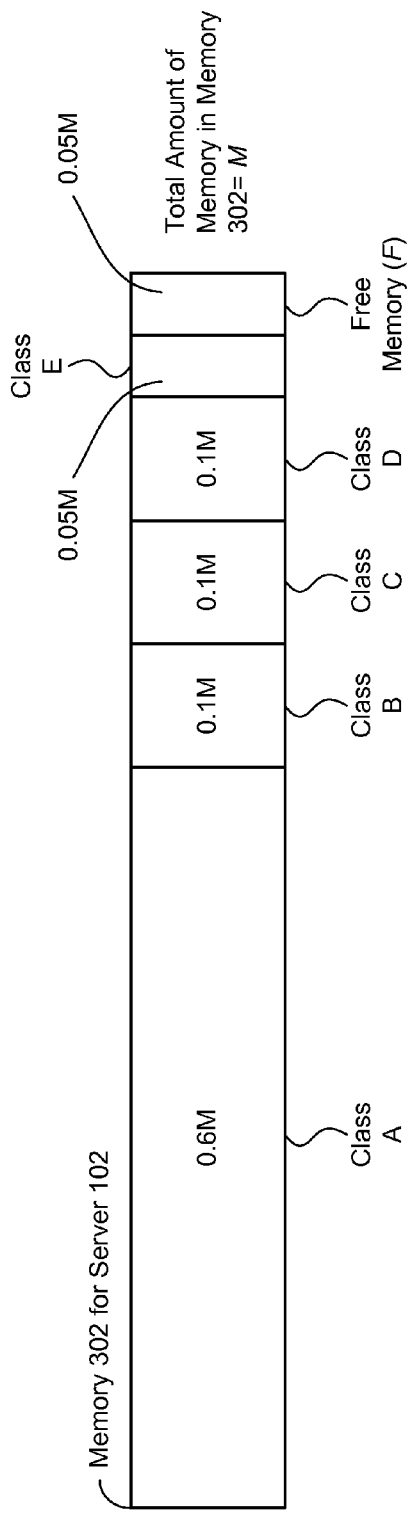
FIG. 3D is a block diagram illustrating another example memory allocation for quality-of-service classes, according to some embodiments.

In FIG. 3D, the current amount of memory used ($U_i$) by processes associated with the quality-of-service classes i (i.e., classes A-E) are as follows: $U_A$=0.6M, $U_R$=0.1M, $U_C$=0.1M, $U_D$=0.1M, and $U_E$=0.05M. The amount free memory F is 0.1M (i.e., F=M−(0.6M+0.1M+0.1M+0.1M+0.05M)). Accordingly, the memory allocations ($A_i$) for the quality-of-service classes i (i.e., Classes A-E) are as follows: $A_A$=0.65M, $A_B$=0.5M, $A_C$=0.35M, $A_D$=0.2M, and $A_E$=0.05M. Since the memory used ($U_A$, $U_B$, $U_C$, $U_D$) by processes associated with each of the quality-of-service Classes A-D is less than its respective memory allocation ($A_A$, $A_B$, $A_C$, $A_D$), when the server 102 receives a request to allocate memory for a process associated with any of the quality-of-service Classes A-D, the server 102 accepts the request and increases the memory allocation for the corresponding quality-of-service class. However, since the memory used ($U_E$) by processes associated with the quality-of-service Class E is equal to its respective memory allocation ($A_E$) when the server 102 receives a request to allocate memory for a process associated with the quality-of-service Class E, the server 102 rejects the request.

Figure 3E:
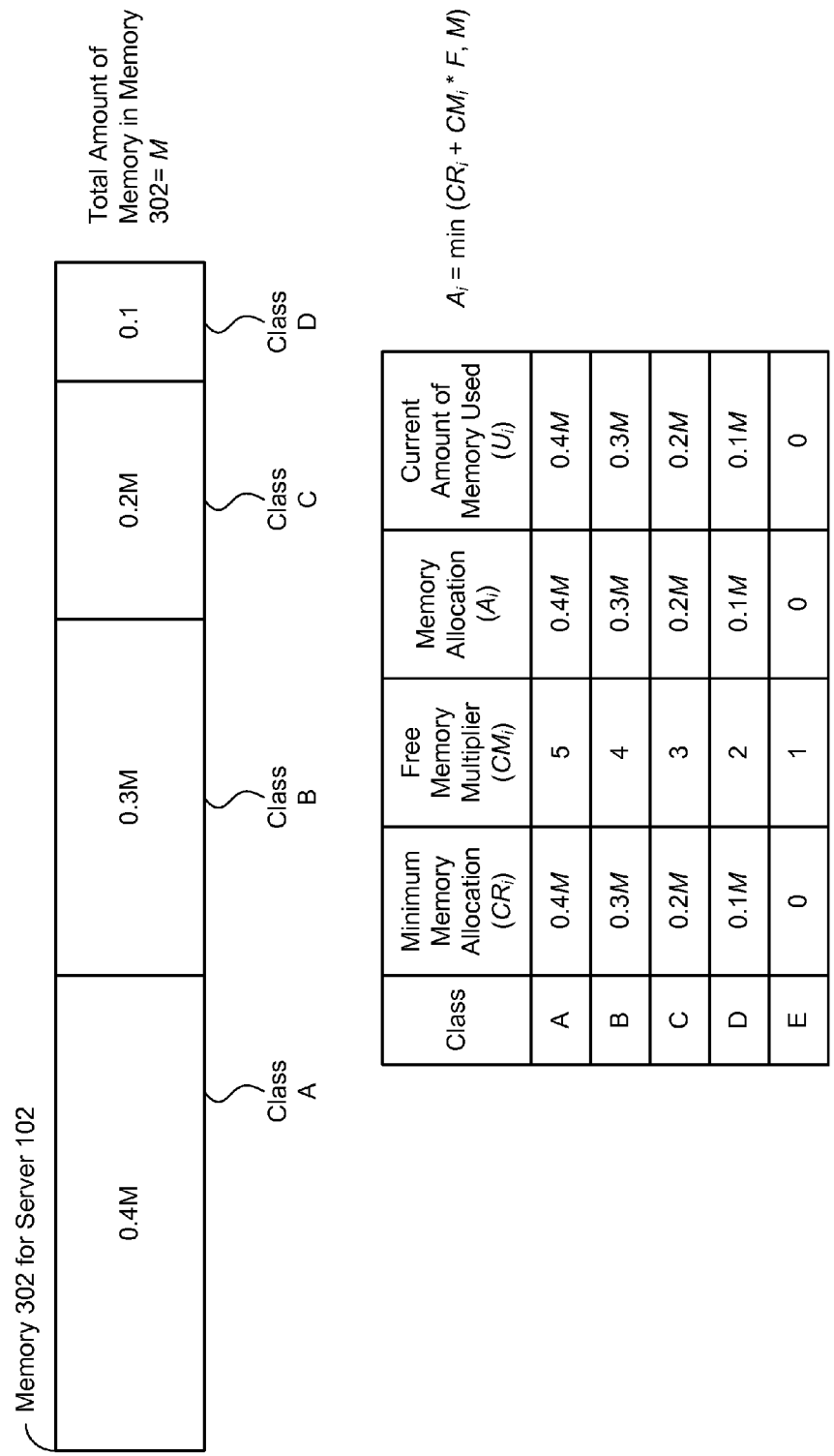
FIG. 3E is a block diagram illustrating another example memory allocation for quality-of-service classes, according to some embodiments.

In FIG. 3E, the current amount of memory used ($U_i$) by processes associated with the quality-of-service classes i (i.e., Classes A-E) are as follows: $U_A$=0.4M, $U_B$=0.3M, $U_C$=0.2M, $U_C$=0.1M, and $U_C$=0. The amount free memory F is 0 (i.e., F=M−(0.4M+0.3M+0.2M+0.1M+0)). Accordingly, the memory allocations ($A_i$) for the quality-of-service classes i (i.e., Classes A-E) are as follows: $A_A$=0.4M, $A_B$=0.3M, $A_C$=0.2M, $A_A$=0.1M, and $A_A$=0. Since the memory used ($U_A$, $U_R$, $U_C$, $U_D$, $U_E$) by processes associated with each of the quality-of-service Classes A-E is equal to its respective memory allocations ($A_A$, $A_B$, $A_C$, $A_D$, $A_E$), when the server 102 receives a request to allocate memory for a process associated with any of the quality-of-service Classes A-E, the server 102 rejects the request.

In some implementations, the processes discussed with reference to FIGS. 3A-3E are repeated hierarchically in response to the server receiving a request to allocate memory for a process. For example, consider a request to allocate memory to a process that is associated with a quality-of-service class. The server 102 may first apply the process discussed above to increase a memory allocation for the quality-of-service class to accommodate the request, then apply the process discussed above to increase a memory allocation for the process within the quality-of-service class to accommodate the request, and then apply the process discussed above to increase a memory allocation for a thread of the process within the quality-of-service class to accommodate the request. Note the memory allocation process may be repeated hierarchically for any number of levels of memory allocation hierarchy to obtain any desired granularity of control for memory allocations. In some implementations, when the memory allocation process is repeated hierarchically, the server 102 allocates the memory to each level of the memory allocation hierarchy after the server 102 accepts the request at the deepest level of the memory allocation hierarchy (e.g., the innermost level of the memory allocation hierarchy). For example, assume that the memory allocation hierarchy includes two levels: a quality-of-service class level and a process level. Thus, in these implementations, the server 102 allocates memory to accommodate the request at both of these levels (the quality-of-service class level and the process level) after the server 102 accepts the request. In some implementations, the server 102 allocates the memory to accommodate the request in hierarchical order from the highest level of the memory allocation hierarchy to the deepest level of the memory allocation hierarchy. In the previous example, the server 102 first allocates the memory to accommodate the request at the quality-of-service class level and then allocates the memory to accommodate the request at the process level.

In some implementations, when a request to allocate memory to a process associated with a quality-of-service class was accepted and later becomes terminated (e.g., the operations associated with the request have been terminated or completed), the server 102 releases memory allocated to the request in the quality-of-service class. In other words, the server 102 releases the memory allocated to accommodate the request in the memory allocation for quality-of-service class. Stated another way, since the request has been terminated, the memory previously used by the request is no longer needed and the server 102 releases the memory allocated to the request in the memory allocation for the quality-of-service class. Note that these implementations may also be applied to release memory allocated to accommodate the request in any level (and/or multiple levels) of the memory allocation hierarchy (e.g., a memory allocation for a quality-of-service class, a memory allocation for a process within the memory allocation for the quality-of-service class, a memory allocation for a thread within the memory allocation for the process that is within the memory allocation for the quality-of-service class, etc.). In some implementations, when memory has been hierarchically allocated to accommodate the request in multiple levels of the memory allocation hierarchy, the server 102 releases the memory allocated to accommodate the request at each level of the memory allocation hierarchy after the server 102 determines that the request has been terminated. For example, assume that the memory allocation hierarchy includes two levels: a quality-of-service class level and a process level. Thus, in these implementations, the server 102 releases the memory allocated to accommodate the request at both of these levels (the quality-of-service class level and the process level) after the server 102 determines that the request has been terminated. In some implementations, the server 102 releases the memory allocated to accommodate the request in reverse hierarchical order from the deepest level of the memory allocation hierarchy to the highest level of the memory allocation hierarchy. In the previous example, the server 102 first releases the memory allocated to accommodate the request from the process level and then releases the memory allocated to accommodate the request from the quality-of-service class level.

In some implementations, the minimum memory allocation ($CR_i$) is omitted from the calculation of the memory allocation for the quality-of-service class (Ai). For example, $A_i$ may be calculated as follows: $A_i$=min ($CM_i$*F, M). In another example, $A_i$ may be calculated as follows: $A_i$=$CM_i$*F.

Figure 4:
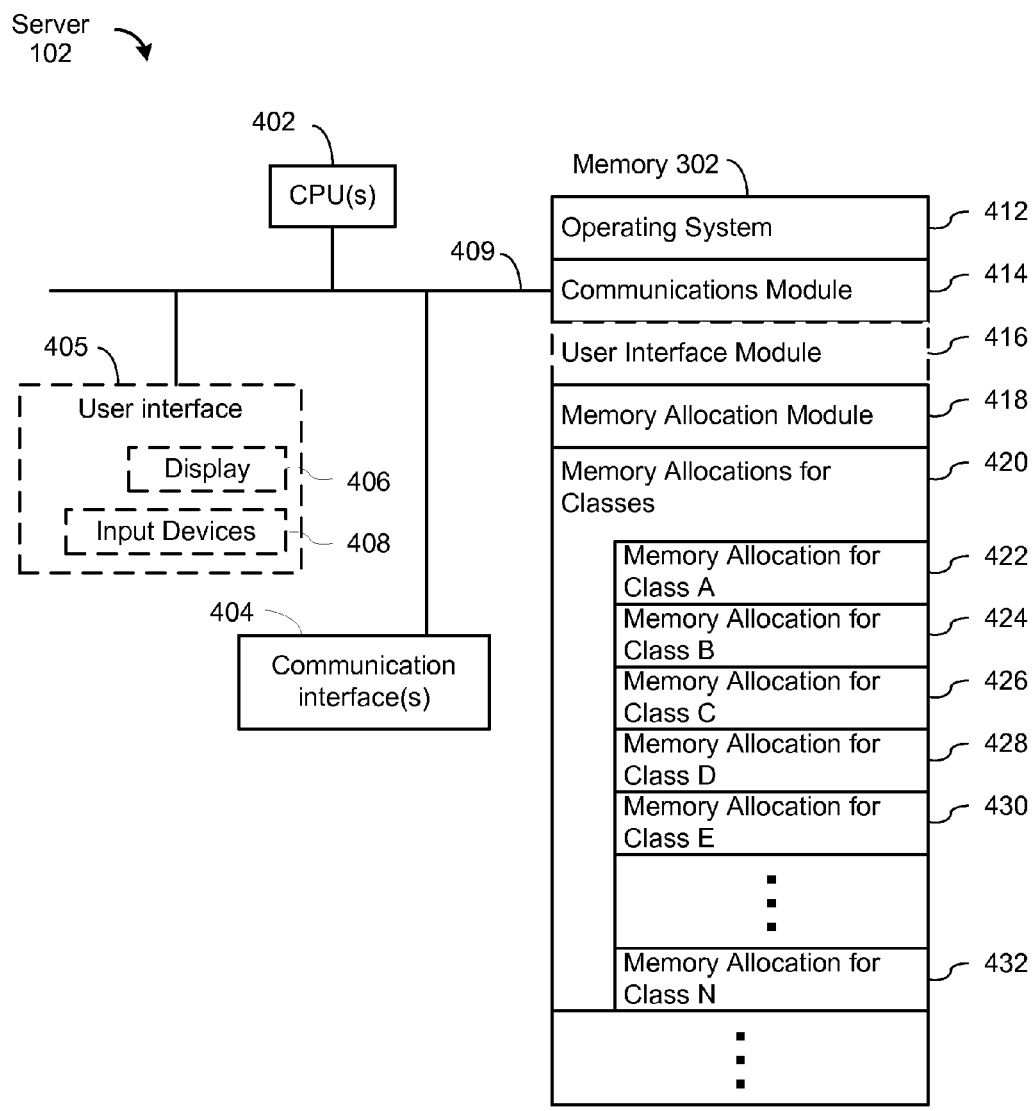
FIG. 4 is a block diagram illustrating a server, according to some embodiments.

FIG. 4 is a block diagram illustrating the server 102, according to some embodiments. The server 102 typically includes one or more processing units (CPU's, sometimes called processors) 402 for executing programs (e.g., programs stored in memory 302), one or more network or other communications interfaces 404, memory 302, and one or more communication buses 409 for interconnecting these components. The communication buses 409 may include circuitry (sometimes called a chipset) that interconnects and controls communications between system components. The server 102 optionally includes (but typically does not include) a user interface 405 comprising a display device 406 and input devices 408 (e.g., keyboard, mouse, touch screen, keypads, etc.). Memory 302 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 302 optionally includes one or more storage devices remotely located from the CPU(s) 402. Memory 302, or alternately the non-volatile memory device(s) within memory 302, comprises a non-transitory computer readable storage medium. In some embodiments, memory 302 or the computer readable storage medium of memory 302 stores the following programs, modules and data structures, or a subset thereof:

- an operating system 412 that includes procedures for handling various basic system services and for performing hardware dependent tasks;
- a communication module 414 that is used for connecting the server 102 to other computers via the one or more communication interfaces 404 (wired or wireless) and one or more communication networks, such as the Internet, other wide area networks, local area networks, metropolitan area networks, and so on;
- an optional user interface module 416 that receives commands from the user via the input devices 408 and generates user interface objects in the display device 406;
- a memory allocation module 418 that manages memory allocations for quality-of-service classes, as described herein; and
- memory allocations 420 for classes, including a memory allocation 422 for Class A, a memory allocation 424 for Class B, a memory allocation 426 for Class C, a memory allocation 428 for Class D, a memory allocation 430 for Class E, and a memory allocation 432 for Class N.

In some embodiments, the programs or modules identified above correspond to sets of instructions for performing a function described above. The sets of instructions can be executed by one or more processors (e.g., the CPUs 402). The above identified modules or programs (i.e., sets of instructions) need not be implemented as separate software programs, procedures or modules, and thus various subsets of these programs or modules may be combined or otherwise re-arranged in various embodiments. In some embodiments, memory 302 stores a subset of the modules and data structures identified above. Furthermore, memory 302 may store additional modules and data structures not described above.

Although FIG. 4 shows a "server," FIG. 4 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 4 could be implemented on single servers and single items could be implemented by one or more servers. The actual number of servers used to implement a server and how features are allocated among them will vary from one implementation to another, and may depend in part on the amount of data traffic that the system must handle during peak usage periods as well as during average usage periods.

Figure 5:
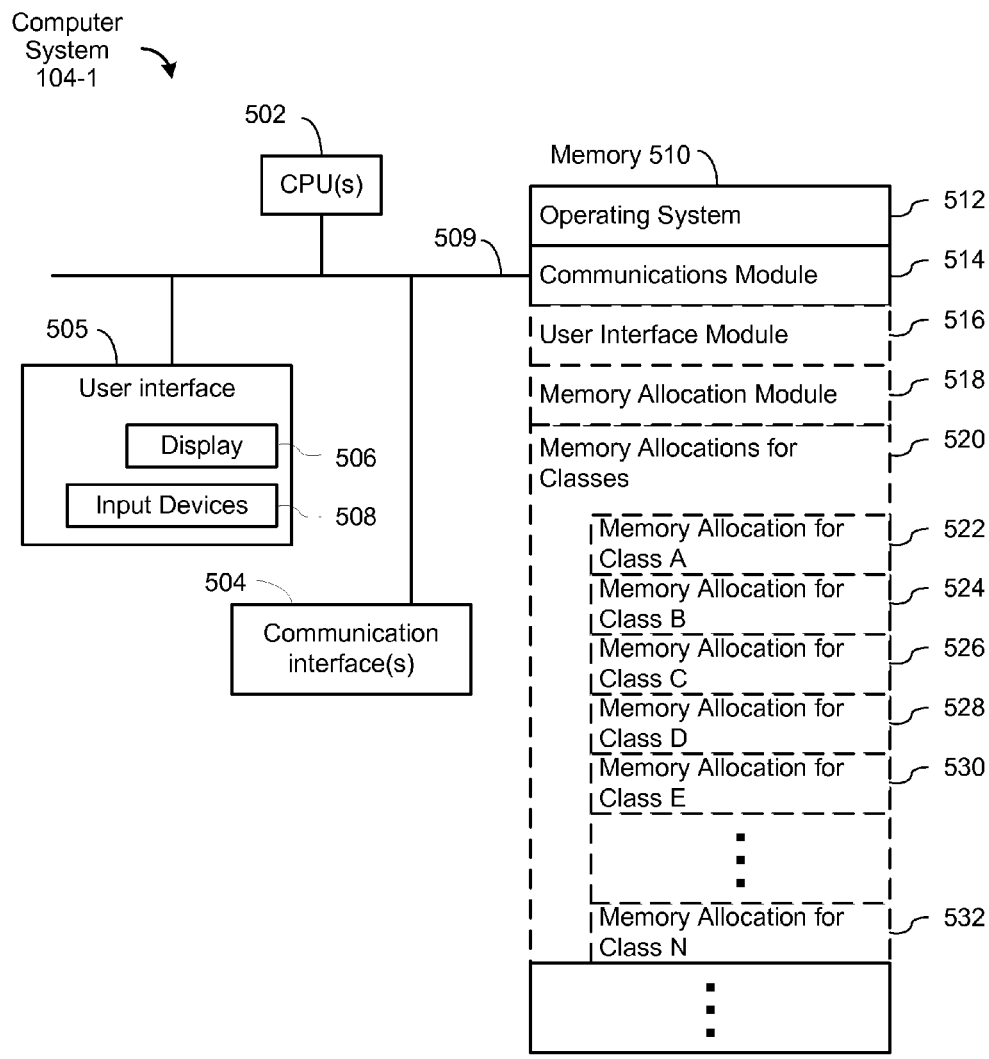
FIG. 5 is a block diagram illustrating a computer system, according to some embodiments.

FIG. 5 is a block diagram illustrating the computer system 104-1, according to some embodiments. Note that the following discussion refers to the computer system 104-1. However, the following discussion may apply to any of the computer systems 104-1 to 104-N. The computer system 104-1 typically includes one or more processing units (CPU's, sometimes called processors) 502 for executing programs (e.g., programs stored in memory 510), one or more network or other communications interfaces 504, memory 510, and one or more communication buses 509 for interconnecting these components. The communication buses 509 may include circuitry (sometimes called a chipset) that interconnects and controls communications between system components. The computer system 104-1 optionally includes (but typically does not include) a user interface 505 comprising a display device 506 and input devices 508 (e.g., keyboard, mouse, touch screen, keypads, etc.). Memory 510 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 510 optionally includes one or more storage devices remotely located from the CPU(s) 502. Memory 510, or alternately the non-volatile memory device(s) within memory 510, comprises a non-transitory computer readable storage medium. In some embodiments, memory 510 or the computer readable storage medium of memory 510 stores the following programs, modules and data structures, or a subset thereof:

- an operating system 512 that includes procedures for handling various basic system services and for performing hardware dependent tasks;
- a communication module 514 that is used for connecting the computer system 104-1 to other computers via the one or more communication interfaces 504 (wired or wireless) and one or more communication networks, such as the Internet, other wide area networks, local area networks, metropolitan area networks, and so on;
- an optional user interface module 516 that receives commands from the user via the input devices 508 and generates user interface objects in the display device 506;
- an optional memory allocation module 518 that manages memory allocations for quality-of-service classes, as described herein; and
- optional memory allocations 520 for classes, including a memory allocation 522 for Class A, a memory allocation 524 for Class B, a memory allocation 526 for Class C, a memory allocation 528 for Class D, a memory allocation 530 for Class E, and a memory allocation 532 for Class N.

In some embodiments, the programs or modules identified above correspond to sets of instructions for performing a function described above. The sets of instructions can be executed by one or more processors (e.g., the CPUs 502). The above identified modules or programs (i.e., sets of instructions) need not be implemented as separate software programs, procedures or modules, and thus various subsets of these programs or modules may be combined or otherwise re-arranged in various embodiments. In some embodiments, memory 510 stores a subset of the modules and data structures identified above. Furthermore, memory 510 may store additional modules and data structures not described above.

Although FIG. 5 shows a "computer," FIG. 5 is intended more as functional description of the various features which may be present in a set of computer systems than as a structural schematic of the embodiments described herein. In practice, and as recognized by those of ordinary skill in the art, items shown separately could be combined and some items could be separated.

Dynamically Allocating Memory for Processes

Figure 6A:
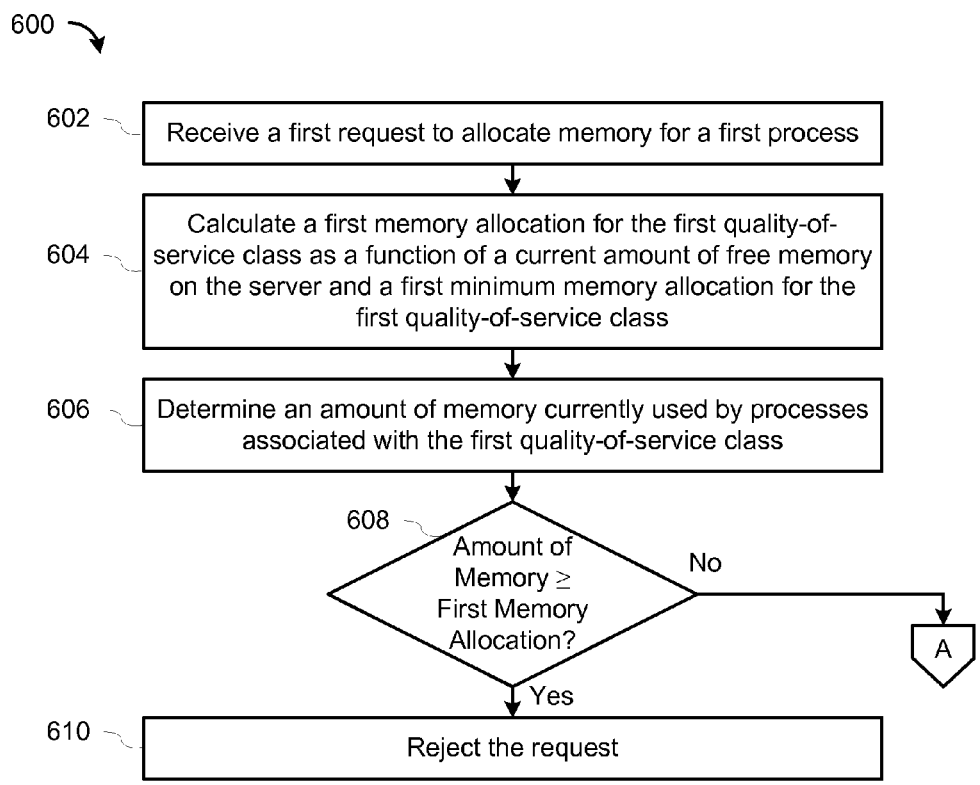
FIG. 6A is a flowchart of a method for dynamically allocating memory for processes, according to some embodiments.
Figure 6B:
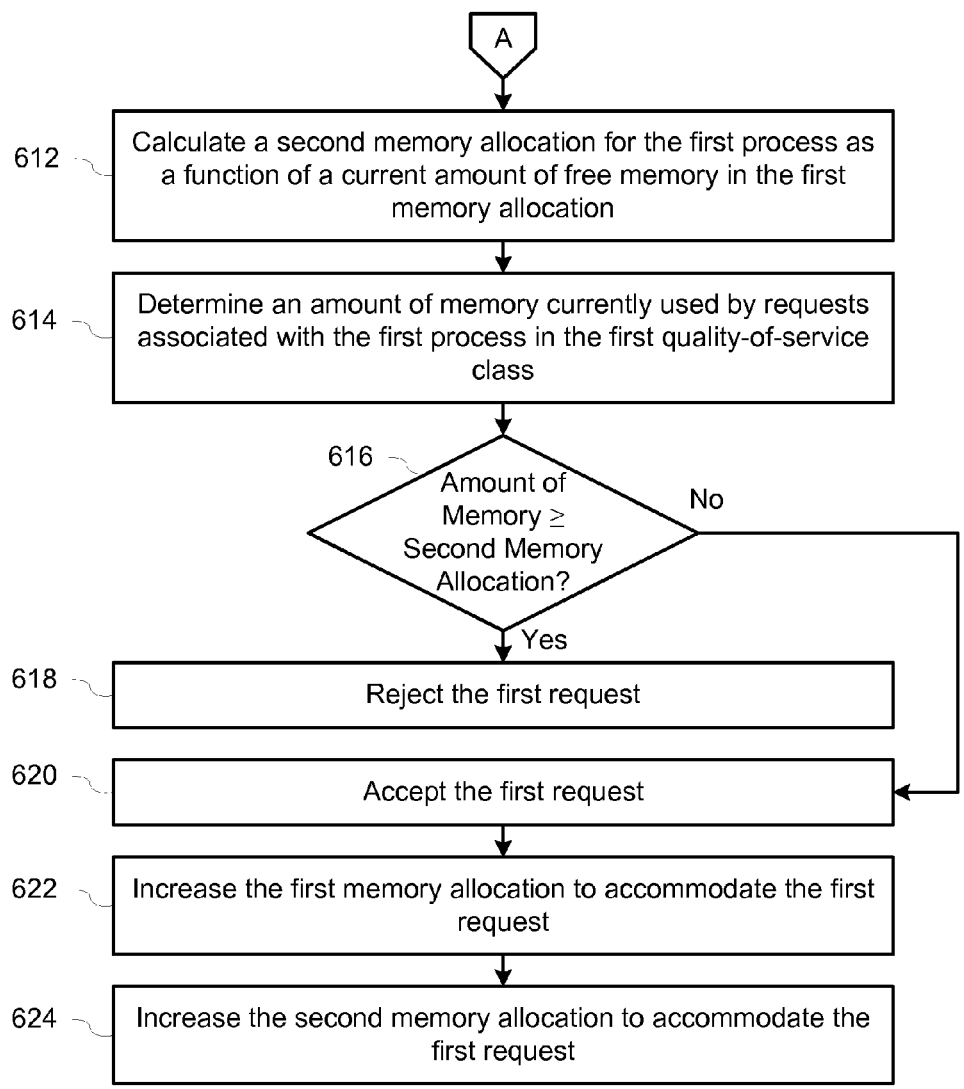
FIG. 6B continues the method illustrated in FIG. 6A.

FIGS. 6A-6B are flowcharts of a method 600 for dynamically allocating memory for processes, according to some embodiments. The memory allocation module 418 receives (602) a first request (e.g., the request 202) to allocate memory for a first process (e.g., the process 222), where the first process is associated with a first quality-of-service class (e.g., Class A) in a plurality of quality-of-service classes (e.g., Classes A-E). In some implementations, the first request includes a network connection request received from a first computer system (e.g., the computer system 104-1) via a network (e.g., network 120). In these implementations, the first process includes a process that handles network traffic between the server 102 and the first computer system. In some implementations, the first request includes a desired amount of memory to be allocated to the first process in the first quality-of-service class.

The memory allocation module 418 calculates (604) a first memory allocation for the first quality-of-service class as a function of a current amount of free memory on the server (F) and a first minimum memory allocation ($CR_1$) for the first quality-of-service class. In some implementations, a sum of a minimum memory allocation for each quality-of-service class in the plurality of quality-of-service classes is no greater than a total amount of memory on the server 102.

The memory allocation module 418 determining (606) an amount of memory currently used ($U_1$) by processes associated with the first quality-of-service class.

When the amount of memory currently used ($U_1$) by the processes associated with the first quality-of-service class is greater than or equal to the first memory allocation (608, yes), the memory allocation module 418 rejects (610) the first request. For example, the memory allocation module 418 may transmit a message (or cause a message to be transmitted) to a computer system that issued the request (e.g., the computer system 104-1) notifying the computer system that the first request was rejected. In some implementations, the computer system retransmits the first request to the server 102 after a predetermined time period has elapsed since a prior transmission of the first request to the server 102. In some implementations, the computer system transmits the first request to another server that is capable of servicing the first request. For example, the computer system may transmit the first request to a server in another server cluster.

In some implementations, the memory allocation module 418 performs operations to verify whether accepting the first request will cause the memory used by the first process (e.g., the process associated with the first request) in the first memory allocation for the first quality-of-service class to exceed the memory allocation for the first process in the first quality-of-service class. In these implementations, the memory allocation module 418 calculates (612) a second memory allocation ($A_{P1}$) for the first process (P1) as a function of a current amount of free memory ($F_1$) in the first memory allocation and determines (614) an amount of memory currently used by requests associated with the first process in the first quality-of-service class. In some implementations, the current amount of free memory ($F_1$) in the first memory allocation (e.g., the memory allocation $A_1$ for the first quality-of-service class) is a difference of the first memory allocation ($A_1$) and the amount of memory currently used by processes associated with the first quality-of-service class ($U_1$).

When the amount of memory used ($U_i$) by the requests associated with the first process (P1) in the first quality-of-service class is greater than or equal to the second memory allocation ($A_{P1}$) (616, yes), the memory allocation module 418 then rejects (618) the first request. For example, the memory allocation module 418 may transmit a message (or cause a message to be transmitted) to a computer system that issued the request (e.g., the computer system 104-1) notifying the computer system that the first request was rejected. In some implementations, the computer system retransmits the first request to the server 102 after a predetermined time period has elapsed since a prior transmission of the first request to the server 102. In some implementations, the computer system transmits the first request to another server that is capable of servicing the first request. For example, the computer system may transmit the first request to a server in another server cluster.

When the amount of memory used ($U_{P1}$) by the requests associated with the first process (P1) in the first quality-of-service class is less than the second memory allocation ($A_{P1}$) (616, no), the memory allocation module 418 accepts (620) the first request, increases (622) the first memory allocation to accommodate the first request and increases (624) the second memory allocation to accommodate the first request.

In some implementations, instead of performing operations 620-624 at the process level of the memory allocation hierarchy, the memory allocation module 418 performs at least one other level of memory allocation operations. For example, the memory allocation module 418 may verify whether accepting the first request will cause the memory used by a first thread of the first process (e.g., the thread of the process associated with the first request) in the second memory allocation for the first process (which is in the first memory allocation for the first quality-of-service class) to exceed the memory allocation for the first thread of the first process in the memory allocation for the first thread (which is in the second memory allocation for the first process, which itself is in the first memory allocation for the first quality-of-service class). In other words, the memory allocation module 418 performs operations analogous to operations 612-624, but at the thread level. In some implementations, the memory allocation module 418 hierarchically repeats the operations discussed above with reference to FIG. 6 for any number of levels of memory allocation hierarchy to obtain any desired granularity of control for memory allocations (see discussion above with reference to FIGS. 3A-3E). In general, after accepting the request at the deepest level of the memory allocation hierarchy, the memory allocation module 418 increases a respective memory allocation corresponding to the request at each level of the memory allocation hierarchy to accommodate the first request. In some implementations, the memory allocation module 418 allocates the memory to accommodate the first request in hierarchical order from the highest level of the memory allocation hierarchy to the deepest level of the memory allocation hierarchy. As illustrated in FIGS. 6A and 6B, the memory allocation hierarchy includes two levels: the quality-of-service class level and the process level. Accordingly, after the memory allocation module 418 accepts (620) the first request, the memory allocation module 418 performs operations 622 and 624, which increase the first memory allocation (the quality-of-service class level) and the second memory allocation (the process level) to accommodate the first request. If the memory allocation hierarchy also includes a thread level, after the memory allocation module 418 accepts (620) the first request, the memory allocation module 418 increase the first memory allocation (the quality-of-service class level), the second memory allocation (the process level), and a third memory allocation (the thread level) to accommodate the first request. Note that for memory allocations corresponding to (or otherwise associated with) the first request, the memory allocations that are higher in the memory allocation hierarchy includes (or contains) the memory allocations that are lower in the memory allocation hierarchy. For example, the quality-of-service class level memory allocation includes (or contains) the process level memory allocation, the process level memory allocation includes (or contains) the thread level memory allocation, and so on.

In some implementations, when the amount of memory currently used ($U_1$) by the processes associated with the first quality-of-service class is less than the first memory allocation ($A_1$) (608, no), the memory allocation module 418 accepts the first request and increases the first memory allocation to accommodate the first request. Thus, in these implementations, the memory allocation module 418 does not perform any further operations to verify (i) whether accepting the first request will cause the memory used by the first process (e.g., the process associated with the first request) in the first memory allocation for the first quality-of-service class to exceed a memory allocation for the first process in the first memory allocation for first-quality-of-service class, (ii) whether accepting the first request will cause the memory used by a first thread of the first process (e.g., the thread of the process associated with the first request) in the memory allocation for the first process (which is in the memory allocation for the first quality-of-service class) to exceed the memory allocation for the first thread of the first process in the memory allocation for the first thread (which is in the memory allocation for the first process, which itself is in the first memory allocation for the first quality-of-service class), and so on. In other words, in these implementations, the memory allocation module 418 does not perform operations 612-624.

Figure 7:
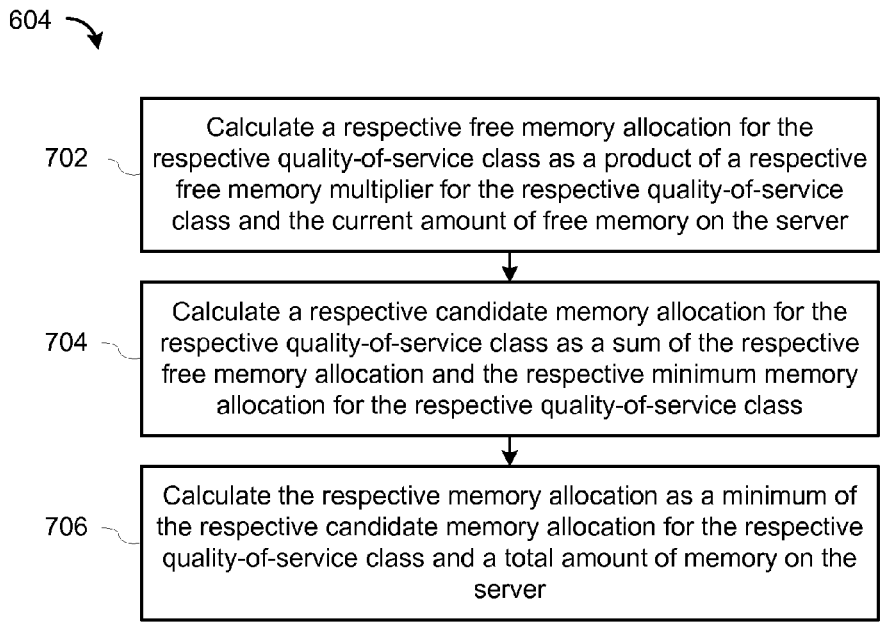
FIG. 7 is a flowchart of a method for calculating a respective memory allocation for a respective quality-of-service class, according to some embodiments.

FIG. 7 is a flowchart of a method for calculating (604) a respective memory allocation for a respective quality-of-service class, according to some embodiments. The memory allocation module 418 calculates (702) a respective free memory allocation for the respective quality-of-service class as a product of a respective free memory multiplier for the respective quality-of-service class and the current amount of free memory on the server ($CM_i*F$). The memory allocation module 418 then calculates (704) a respective candidate memory allocation for the respective quality-of-service class as a sum of the respective free memory allocation and the respective minimum memory allocation for the respective quality-of-service class ($CR_i+CM_i*F$). The memory allocation module 418 calculates (706) the respective memory allocation as a minimum of the respective candidate memory allocation for the respective quality-of-service class and a predetermined amount of memory ($\min(CR_i+CM_i*F, X)$). In some implementations, the predetermined amount of memory is the total amount of memory on the server 102 (e.g., M).

Figure 8:
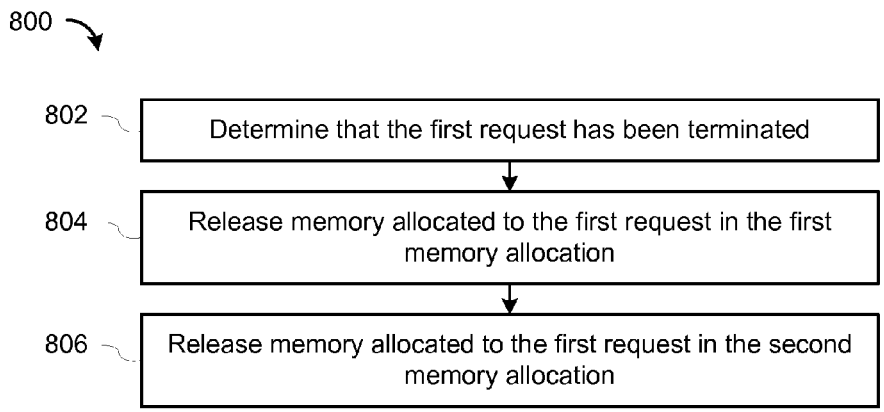
FIG. 8 is a flowchart of a method for releasing memory allocated to a process, according to some embodiments.

FIG. 8 is a flowchart of a method 800 for releasing memory allocated to a process, according to some embodiments. The memory allocation module 418 determines (802) that the first request has been terminated, releases (804) memory allocated to the first request in the first memory allocation, and releases (806) memory allocated to the first request in the second memory allocation. In some implementations, when memory has been hierarchically allocated to accommodate the request in multiple levels of the memory allocation hierarchy, the memory allocation module 418 releases the memory allocated to accommodate the first at each level of the memory allocation hierarchy after the memory allocation module 418 determines that the request has been terminated (see discussion above with reference to FIGS. 3A-3E). In some implementations, the memory allocation module 418 releases the memory allocated to accommodate the request in reverse hierarchical order from the deepest level of the memory allocation hierarchy to the highest level of the memory allocation hierarchy.

The benefits of the implementations described above include (1) the server 102 maintains high utilization of memory without sacrificing prioritization between quality-of-service classes and (2) the server 102 can dynamically adjust the memory allocations for the quality-of-service classes (processes, threads, etc.) based on the current amount of memory used (and/or the current amount of free memory) on the server 102.

Note that although the discussion above refers to the memory allocation module 418 performing the operations illustrated in FIGS. 6-8, these operations may be performed by any module (or modules) of the server 102 (or any other computer system such as the computer systems 104-1 to 104-N). Also note that in the implementations described above, a larger value for the free memory multiplier ($CM_i$) results in the higher (better) memory utilization. Moreover note that in the implementations described above, the memory is statically divided between quality-of-service classes based on their minimum memory allocations ($CR_i$) during overload scenarios (e.g., as illustrated in FIG. 3E). Furthermore note that in the implementations described above, each quality-of-service class is able to take advantage of the free memory during underloaded scenarios without consuming the whole memory (e.g., see FIGS. 3A-3D). Accordingly, the server 102 does not need to page memory from memory 302 to disk.

The methods illustrated in FIGS. 6-8 may be governed by instructions that are stored in a computer readable storage medium and that are executed by at least one processor of at least one server. Each of the operations shown in FIGS. 6-8 may correspond to instructions stored in a non-transitory computer memory or computer readable storage medium. In various implementations, the non-transitory computer readable storage medium includes a magnetic or optical disk storage device, solid state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A computer-implemented method for dynamically allocating memory for processes, performed on a server having at least one processor and memory storing at least one program for execution by the at least one processor to perform the method, comprising:
    receiving a first request to allocate memory for a first process, the first process being associated with a first quality-of-service class in a plurality of quality-of-service classes;
    calculating a first memory allocation for the first quality-of-service class as a function of a current amount of free memory on the server and a first minimum memory allocation for the first quality-of-service class;
    determining an amount of memory currently used by processes associated with the first quality-of-service class; and
    rejecting the first request when the amount of memory currently used by the processes associated with the first quality-of-service class is greater than or equal to the first memory allocation.

2. The computer-implemented method of claim 1, wherein when the amount of memory currently used by the processes associated with the first quality-of-service class is less than the first memory allocation, the method further comprises:
    calculating a second memory allocation for the first process as a function of a current amount of free memory in the first memory allocation;
    determining an amount of memory currently used by requests associated with the first process in the first quality-of-service class; and
    rejecting the first request when the amount of memory used by the requests associated with the first process in the first quality-of-service class is greater than or equal to the second memory allocation.

3. The computer-implemented method of claim 2, wherein the current amount of free memory in the first memory allocation is a difference of the first memory allocation and the amount of memory currently used by processes associated with the first quality-of-service class.

4. The computer-implemented method of claim 2, wherein when the amount of memory used by the requests associated with the first process in the first quality-of-service class is less than the second memory allocation, the method further comprises:
    accepting the first request;
    increasing the first memory allocation to accommodate the first request; and
    increasing the second memory allocation to accommodate the first request.

5. The computer-implemented method of claim 4, further comprising:
    determining that the first request has been terminated;
    releasing memory allocated to the first request in the first memory allocation; and
    releasing memory allocated to the first request in the second memory allocation.

6. The computer-implemented method of claim 2, wherein calculating the second memory allocation as a function of the current amount of free memory in the first memory allocation includes calculating the second memory allocation as a product of a free memory multiplier for the first process and the current amount of free memory in the first memory allocation.

7. The computer-implemented method of claim 1, wherein calculating a respective memory allocation for a respective quality-of-service class as the function of the current amount of free memory on the server and a respective minimum memory allocation for the respective quality-of-service class includes:
- calculating a respective free memory allocation for the respective quality-of-service class as a product of a respective free memory multiplier for the respective quality-of-service class and the current amount of free memory on the server;
- calculating a respective candidate memory allocation for the respective quality-of-service class as a sum of the respective free memory allocation and the respective minimum memory allocation for the respective quality-of-service class; and
- calculating the respective memory allocation as a minimum of the respective candidate memory allocation for the respective quality-of-service class and a predetermined amount of memory.

8. The computer-implemented method of claim 1, wherein the predetermined amount of memory is a total amount of memory on the server.

9. The computer-implemented method of claim 1, wherein the first request includes a network connection request received from a first computer system via a network, and wherein the first process includes a process that handles network traffic between the server and the first computer system.

10. The computer-implemented method of claim 1, wherein a sum of a minimum memory allocation for each quality-of-service class in the plurality of quality-of-service classes is no greater than a total amount of memory on the server.

11. The computer-implemented method of claim 1, wherein the first request includes a desired amount of memory to be allocated to the first process in the first quality-of-service class.

12. A system to dynamically allocate memory for processes, comprising:
- at least one processor;
- memory; and
- at least one program stored in the memory and executable by the at least one processor, the at least one program comprising instructions to:
  - receive a first request to allocate memory for a first process, the first process being associated with a first quality-of-service class in a plurality of quality-of-service classes;
  - calculate a first memory allocation for the first quality-of-service class as a function of a current amount of free memory on the server and a first minimum memory allocation for the first quality-of-service class;
  - determine an amount of memory currently used by processes associated with the first quality-of-service class; and
  - reject the first request when the amount of memory currently used by the processes associated with the first quality-of-service class is greater than or equal to the first memory allocation.

13. The system of claim 12, wherein when the amount of memory currently used by the processes associated with the first quality-of-service class is less than the first memory allocation, the at least one program includes instructions to:
- calculate a second memory allocation for the first process as a function of a current amount of free memory in the first memory allocation;
- determine an amount of memory currently used by requests associated with the first process in the first quality-of-service class; and
- reject the first request when the amount of memory used by the requests associated with the first process in the first quality-of-service class is greater than or equal to the second memory allocation.

14. The system of claim 13, wherein the instructions to calculate the second memory allocation as a function of the current amount of free memory in the first memory allocation include instructions to calculate the second memory allocation as a product of a free memory multiplier for the first process and the current amount of free memory in the first memory allocation.

15. The system of claim 12, wherein the instructions to calculate a respective memory allocation for a respective quality-of-service class as the function of the current amount of free memory on the server and a respective minimum memory allocation for the respective quality-of-service class include instructions to:
- calculate a respective free memory allocation for the respective quality-of-service class as a product of a respective free memory multiplier for the respective quality-of-service class and the current amount of free memory on the server;
- calculate a respective candidate memory allocation for the respective quality-of-service class as a sum of the respective free memory allocation and the respective minimum memory allocation for the respective quality-of-service class; and
- calculate the respective memory allocation as a minimum of the respective candidate memory allocation for the respective quality-of-service class and a predetermined amount of memory.

16. The system of claim 12, wherein the first request includes a network connection request received from a first computer system via a network, and wherein the first process includes a process that handles network traffic between the server and the first computer system.

17. A non-transitory computer readable storage medium storing at least one program configured for execution by at least one processor of a computer system, the at least one program comprising instructions to:
- receive a first request to allocate memory for a first process, the first process being associated with a first quality-of-service class in a plurality of quality-of-service classes;
- calculate a first memory allocation for the first quality-of-service class as a function of a current amount of free memory on the server and a first minimum memory allocation for the first quality-of-service class;
- determine an amount of memory currently used by processes associated with the first quality-of-service class; and
- reject the first request when the amount of memory currently used by the processes associated with the first quality-of-service class is greater than or equal to the first memory allocation.

18. The non-transitory computer readable storage medium of claim 17, wherein when the amount of memory currently used by the processes associated with the first quality-of-service class is less than the first memory allocation, the at least one program includes instructions to:
- calculate a second memory allocation for the first process as a function of a current amount of free memory in the first memory allocation;
- determine an amount of memory currently used by requests associated with the first process in the first quality-of-service class; and reject the first request when the amount of memory used by the requests associated with the first process in the first quality-of-service class is greater than or equal to the second memory allocation.

19. The non-transitory computer readable storage medium of claim 18, wherein when the amount of memory used by the requests associated with the first process in the first quality-of-service class is less than the second memory allocation, the at least one program includes instructions to:

accept the first request;

increase the first memory allocation to accommodate the first request; and increase the second memory allocation to accommodate the first request.

20. The non-transitory computer readable storage medium of claim 19, wherein the at least one program includes instructions to:

determine that the first request has been terminated;

release memory allocated to the first request in the first memory allocation; and release memory allocated to the first request in the second memory allocation.

\* \* \* \* \*